Figure 1:
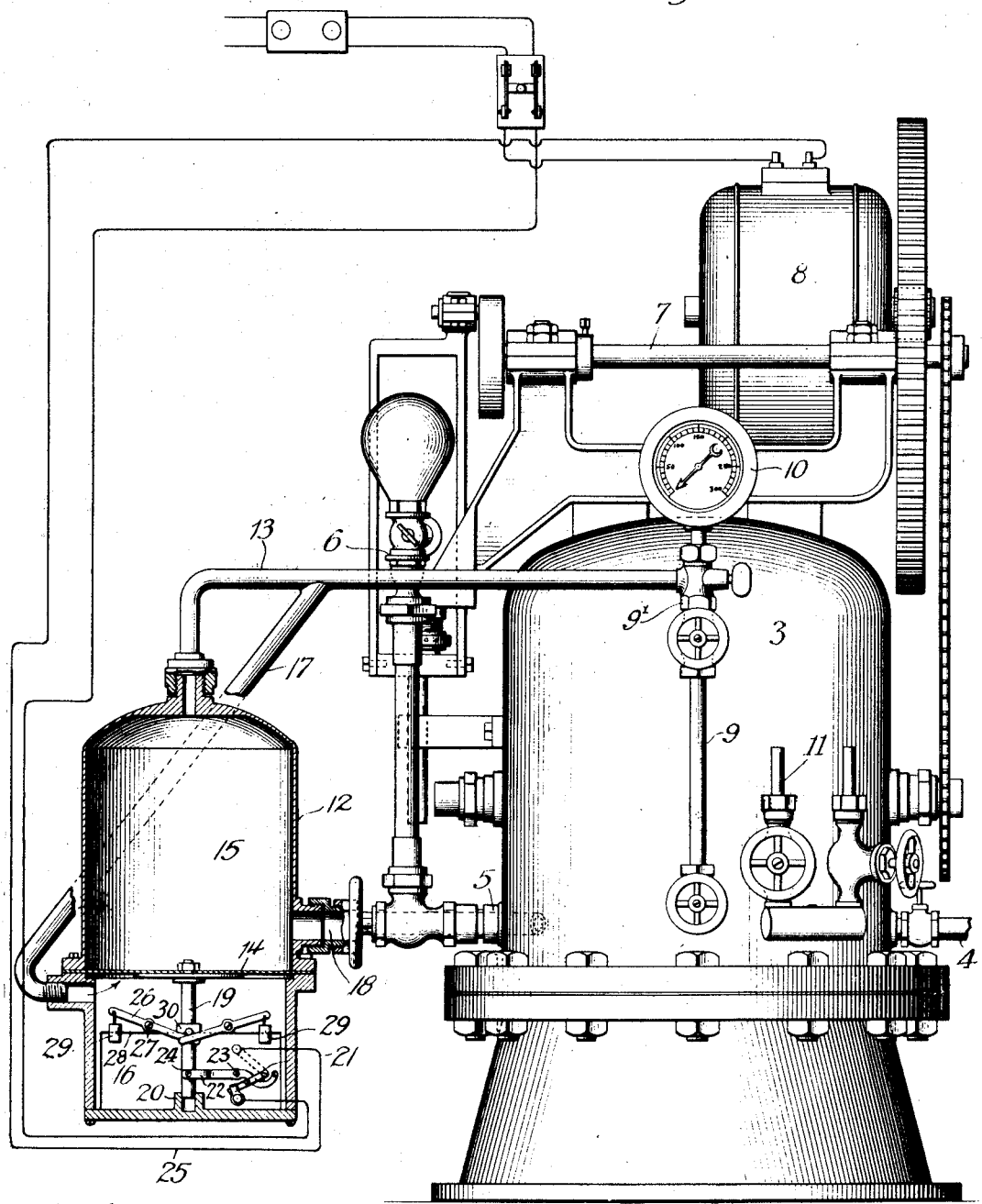

C. L. BASTIAN.
CARBONATING APPARATUS.
APPLICATION FILED NOV. 1, 1909.

978,103.

Patented Dec. 6, 1910.

2 SHEETS—SHEET 1.

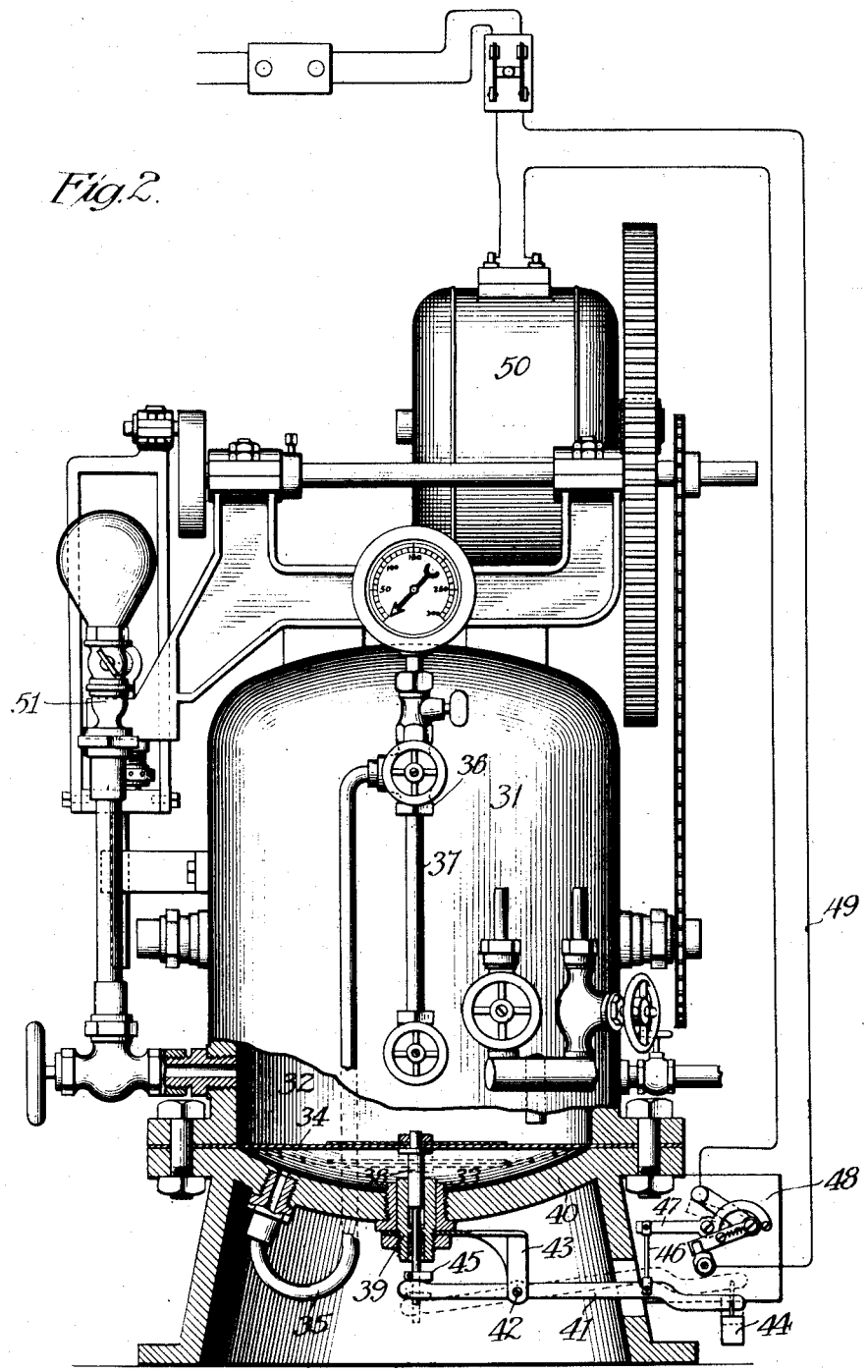

UNITED STATES PATENT OFFICE.

CHARLES L. BASTIAN, OF CHICAGO, ILLINOIS.

CARBONATING APPARATUS.

978,103.

Specification of Letters Patent.

Patented Dec. 6, 1910.

Application filed November 1, 1909. Serial No. 525,623.

*To all whom it may concern:*

Be it known that I, CHARLES L. BASTIAN, a citizen of the United States, residing at Chicago, in the county of Cook and State of Illinois, have invented new and useful Improvements in Carbonating Apparatus, of which the following is a specification.

This invention relates to improvements in carbonating apparatus and its primary object is to provide means of novel and simple character for automatically regulating the supply of water to be carbonated. Heretofore it has been customary to regulate the water supply by means of a float valve controlled by the level of the water in the carbonating tank, or by a balanced tank hung on a counter-balance lever which is adapted to control a valve mechanism in the water supply. These two regulating means have been made in a variety of forms and have been commonly used, notwithstanding they are open to many objections. The float means is objectionable because it has been found inconvenient to locate operative parts of this character within the mixing chamber of the carbonating tank, as the float is liable to leak or collapse and the parts may need adjustment or repair which is difficult and expensive because of their inaccessibility. The balanced tank construction is objectionable because the hose with which it is connected at top and bottom with the carbonating tank stiffens, twists out of shape and wears out rapidly and in actual practice the balance lever is often rendered inoperative by placing things on or against it.

My invention has for its object to overcome the difficulties incident to these water regulating means for carbonating machines heretofore employed by providing automatic means of simple construction and sensitive in operation which can be readily incorporated in a machine of this character and are not liable to get out of order.

A further object of the invention is to provide a diaphragm which is controlled in its operation by the weight of the water and is suitably connected to regulate the supply of water admitted to the carbonating tank as the water in the carbonating tank varies from the predetermined level.

In the drawings I have shown my invention embodied in a carbonating apparatus which comprises an electrically operated pump for supplying the carbonating tank with water but it will be understood that while this is at present the preferred embodiment the invention can also be applied in other ways to control the water supply.

Figure 1 illustrates a carbonating machine, partly in section, in which the water supply controlling means is embodied in a supplemental tank connected with a carbonating tank. Fig. 2 illustrates a carbonating machine in which the water supply controlling means is located in the carbonating tank.

Referring to the drawings, 3 is the carbonating tank provided with a valved gas inlet 4 and a water inlet 5. A pump 6 pumps water into the carbonating tank through the inlet 5 and this pump is operated, in the forms illustrated, by a crank shaft 7 which is driven by an electric motor 8. A gage glass 9 is connected with the carbonating tank above and below the water level therein and is provided with a pressure indicator 10. A plurality of valved water outlet nipples 11 is connected to the tank.

The features of construction heretofore mentioned have been employed with more or less variation and construction in carbonating apparatus and my invention may be embodied in the construction illustrated or with a carbonating machine of any other construction to which it is adaptable.

Referring particularly to Fig. 1, a supplemental tank 12 is connected at its top by a pipe 13 to the gage glass connection 9' with the carbonating tank. A diaphragm 14 is secured in the tank 12 to divide it into a water chamber 15 and a diaphragm chamber 16. The diaphragm chamber is connected by a pipe 17 with the pipe 13 so that both chambers of the supplemental tank are connected with the air or gas space in the top of the carbonating tank above the water therein. The water chamber 15 of the supplemental tank is connected by a pipe 18 with the carbonating tank below the level of the water therein so that the level of the water in the supplemental tank will always correspond with the level of the water in the carbonating tank. The stem 19 is secured to the diaphragm 14 and extends downward through the diaphragm chamber 16 and has its lower end guided in a socket 20 at the bottom of the supplemental tank. An electric snap switch 21 of suitable construction (shown closed) is arranged within the chamber 16 and the switch lever 22 which is pivoted at 23 is pivotally connected at 24 to the stem 19. This switch is in the electric circuit designated generally 25 which includes the motor 8 and controls the supply of current thereto. Levers 26 are pivotally mounted at 27 on a cross piece 28 within the diaphragm chamber 16 and carry weights 29 at their outer ends. The inner ends of these levers are arranged beneath a collar 30 on the stem 19 and these levers facilitate the return of the diaphragm to normal position.

In practice the chamber 15 of the supplemental tank will be supplied with water from the carbonating tank through the pipe 18, and both chambers 15 and 16 will be supplied with air or gas pressure through the pipes 13 and 17. The level of the water in the chamber 15 will correspond with the level of the water in the carbonating tank and the pressure in the chambers 15 and 16 will correspond to the air or gas pressure above the water in the carbonating tank. Thus the air or gas pressure in the chambers 15 and 16 of the supplemental tank is balanced above and below the diaphragm, which permits the diaphragm to be operated entirely by the weight of the water therein. The parts are adjusted to sustain the diaphragm in neutral position while the water in the chamber 15 and the tank is at the predetermined level, but when the water in the apparatus rises above the predetermined level the diaphragm will be flexed by the weight of the water in the chamber 15, thus moving the stem downward and operating the switch lever to open the switch. This stops the motor and the pump ceases to pump water into the carbonating tank. When the level of the water in the apparatus falls below the predetermined level, the diaphragm returns to normal position, its action being facilitated by the weighted levers, to raise the stem, thereby throwing the switch to closed position and starting the motor and the pump.

In the construction of Fig. 2, the corbonating tank 31 has a water or mixing chamber 32 and a diaphragm chamber 33 separated by a diaphragm 34 which is secured in a suitable manner in the tank. The diaphragm chamber is connected by a pipe 35 with the carbonating tank, above the level of the water therein, as, for example, at the connection 36 of the gage glass 37. A stem 38 is fastened to the diaphragm and projects downward through the diaphragm chamber 33 and through a stuffing box 39 in the bottom 40 of the carbonating tank. A lever 41 is pivoted at 42 on a bracket 43 and this lever carries a weight 44 at one end and has its other end arranged to engage a collar 45 on the stem 38. The lever 41 is connected by a link 46 with the lever 47 of an electric snap switch 48 (shown closed). This switch is in the electric circuit designated generally 49 which includes the motor 50 which operates the water pump 51 in the manner heretofore described.

The apparatus illustrated in Fig. 2 operates in all substantial respects in the same manner as the apparatus illustrated in Fig. 1 but the construction is simplified by eliminating the supplemental tank. The air or gas pressure in the water chamber 32 and the diaphragm chamber 33 is equalized above and below the diaphragm and the latter is operated by the weight of the water in the chamber 32. The parts are adjusted to hold the diaphragm in neutral position when the water in the carbonating tank is at or below the predetermined level, but when the water rises above this level the weight of the water will flex the diaphragm to move the stem 38 downward and operate the lever 41 to open the switch and stop the motor and pump. When the water in the chamber 32 falls below the predetermined level the diaphragm will return to neutral position and at the same time close the switch, thereby starting the motor and pump in operation.

In each construction the diaphragm will tend to return to neutral position when the water above the diaphragm falls below the predetermined level but the weighted levers will insure this return. In the construction of Fig. 1 the principal operative parts of the water controlling means are located within the supplemental tank and in the construction of Fig. 2 they are located within and beneath the carbonating tank; in both constructions they are protected against accidental injury and against any usual interference with the operation of parts.

The invention is simple in construction and sensitive in its operation and it controls the water supply for the carbonator automatically as required to maintain in the carbonating tank the constant supply required in a particular case.

The predetermined level should be below the top of the gage glass and the lowest level must be above the bottom of the gage glass so that the water level will show in the glass at all times. By regulating the weights and the friction of the snap switch the range between the high and low levels of the water is controlled.

What I claim and desire to secure by Letters Patent is:

1. In a carbonating apparatus, the combination of a carbonating tank, means for supplying gas to the tank, means for supplying water to the tank, a flexible diaphragm positioned to be flexed when the water in the tank reaches a predetermined level, and means connected with and disposed beneath the diaphragm and adapted to be actuated by said diaphragm for controlling the operation of said water supplying means.

2. In a carbonating apparatus, the combination of a closed carbonating tank, means for supplying gas to the tank, means for supplying water to the tank, a flexible diaphragm adapted to be flexed when the water in the tank reaches a predetermined level, means disposed beneath and adapted to be operated by said diaphragm for controlling the operation of said water supplying means, and means establishing communication between the carbonating tank above the level of the water therein and the chamber beneath said diaphragm.

3. In a carbonating apparatus, the combination of a carbonating tank, means for supplying water and gas to the tank, and means for controlling the water supply comprising a diaphragm adapted to be flexed in one direction by the weight of the water when the predetermined level is reached in the tank to shut off the water supply and adapted to return to neutral position when the water in the tank falls below the predetermined level to turn on the water supply connections between the chamber beneath said diaphragm and the carbonating tank above the level of the water therein.

4. In a carbonating apparatus, the combination of a stationary carbonating tank, means for supplying gas to the tank, a pump for supplying water to the tank, an electric motor for operating the pump, an electric circuit, a switch in said circuit, a diaphragm adapted to be operated by the weight of the water and connections including a pivoted lever between said diaphragm and said switch to operate said switch.

5. In a carbonating apparatus, the combination of a carbonating tank, means for supplying gas to the tank, a pump for supplying water to the tank, an electric motor for operating the pump, an electric circuit, a switch in said circuit, a diaphragm connected with said switch and adapted to throw the same to open position when the water in the tank reaches a predetermined level and to throw the switch to closed position when the water in the tank falls below said level and means establishing communication between the upper part of the tank and the chamber beneath said diaphragm.

6. In a carbonating apparatus, the combination of a carbonating tank, means for supplying water and gas to the tank, a supplemental tank having a water chamber and a diaphragm chamber, a diaphragm in the tank between said chambers, a water connection between the supplemental tank and the carbonating tank, means for equalizing the pressure in the diaphragm chamber and in the water chamber above the level of the water therein with the pressure in the tank above the level of the water therein, and means operated by said diaphragm for regulating the supply of water.

7. In a carbonating apparatus, the combination of a carbonating tank, means for supplying gas to the tank, a pump for supplying water to the tank, an electric motor for operating the pump, an electric circuit, an electric switch in said circuit, a supplemental tank having a water chamber and a diaphragm chamber, a diaphragm in the tank separating said chambers, a water connection between the water chamber and the carbonating tank, means for equalizing the pressure in the diaphragm chamber and in the water chamber above the level of the water therein with the pressure in the carbonating tank above the level of the water therein, and connections between said diaphragm and switch whereby the diaphragm is adapted to be operated by the weight of the water in the supplemental tank to throw the switch to open position when the water in the carbonating tank reaches a predetermined level.

8. In a carbonating apparatus, the combination of a carbonating tank, means for supplying water and gas to the tank, and means for controlling the water supply comprising a diaphragm adapted to be flexed in one direction by the weight of the water when the water in the carbonating tank reaches a predetermined level to shut off the water supply and adapted to return to normal position when the water supply in the tank falls below the predetermined level, a stem on the diaphragm, a weighted lever arranged to engage the stem to facilitate the return of the diaphragm to normal position, a motor circuit and a switch connected to said lever whereby the motor is controlled by the actuation of said diaphragm.

9. In a carbonating apparatus, the combination of a closed carbonating tank, means for supplying water and gas to the tank, means comprising a diaphragm adapted to operate automatically to control the water supply to the tank, and means connecting the chamber beneath the diaphragm with the chamber above the diaphragm for balancing the air or gas pressure above and below the diaphragm.

CHARLES L. BASTIAN.

Witnesses:
Wm F. Belt,
M. A. Kiddie.